May 30, 1933.   J. DE LA CIERVA   1,911,183
AIRCRAFT WITH ROTATIVE SUSTAINING BLADES
Filed Nov. 24, 1930   3 Sheets-Sheet 2
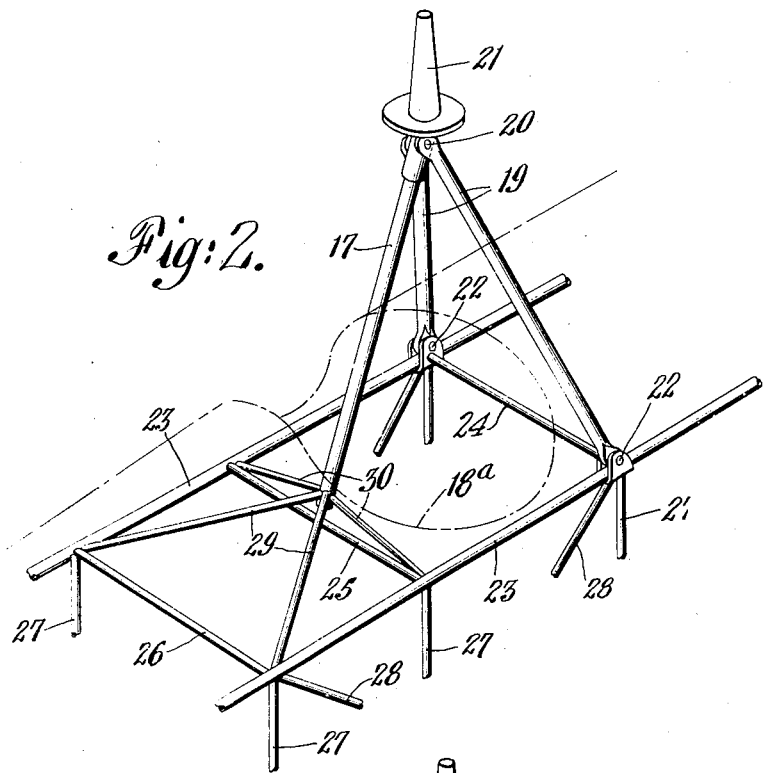
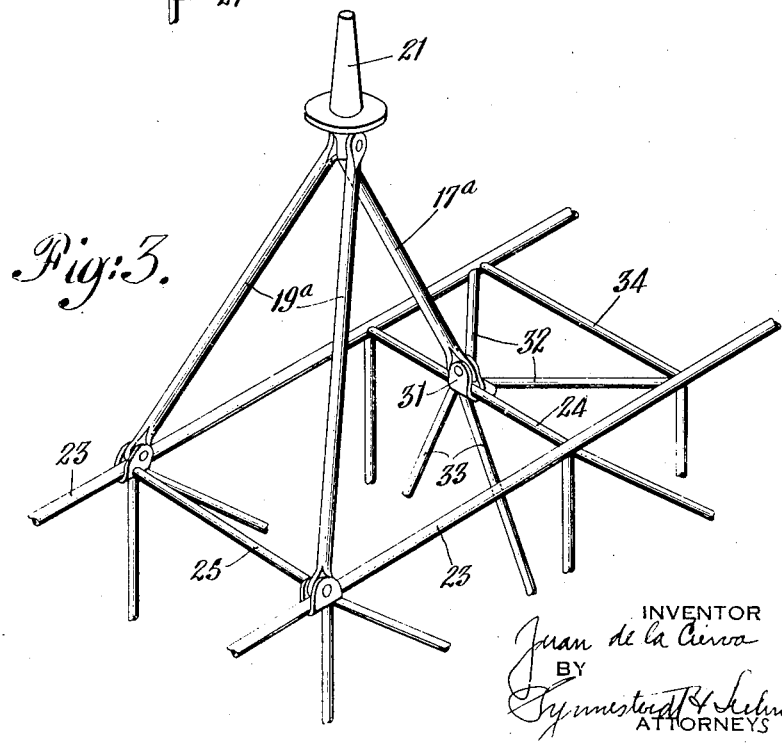

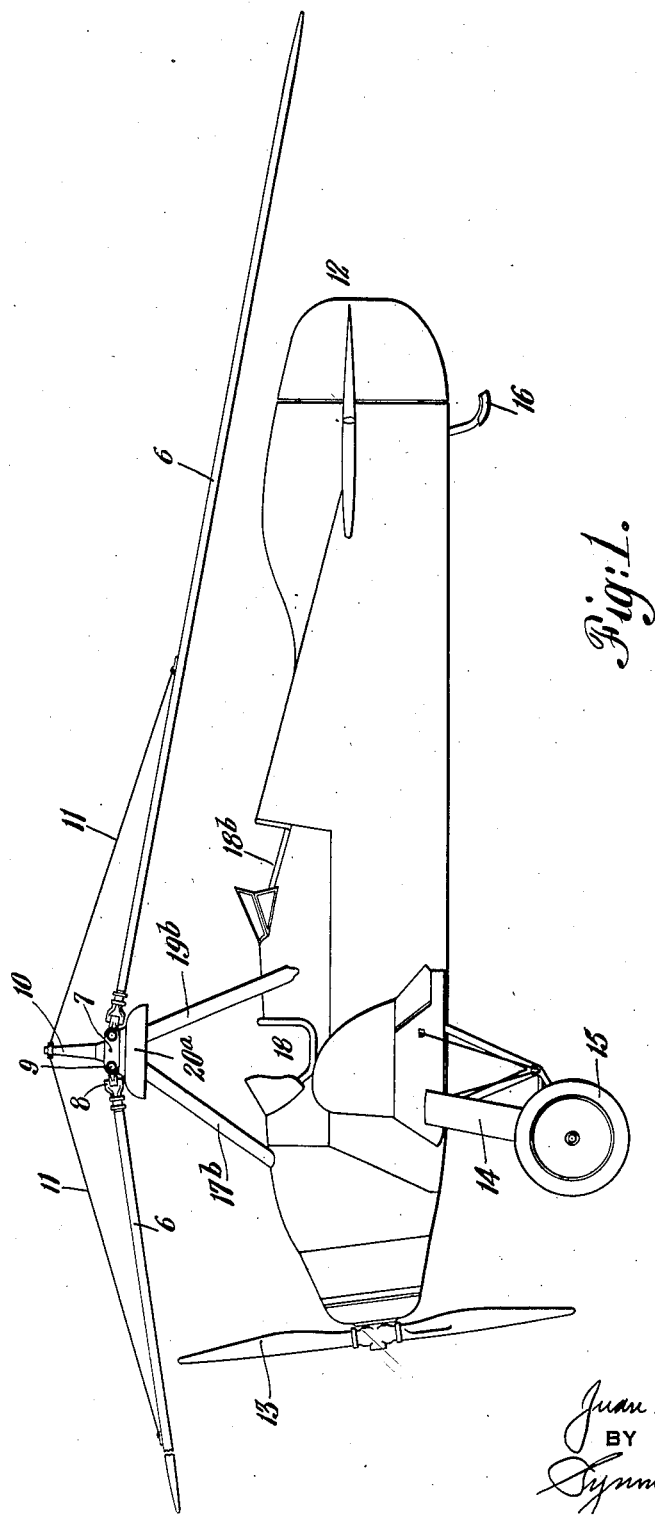

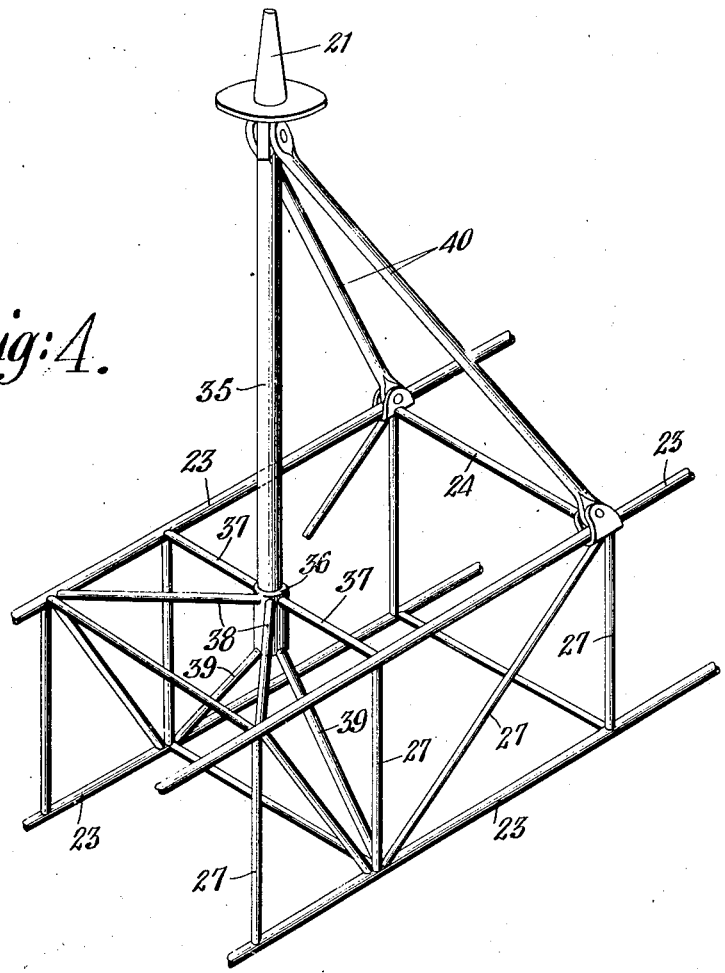
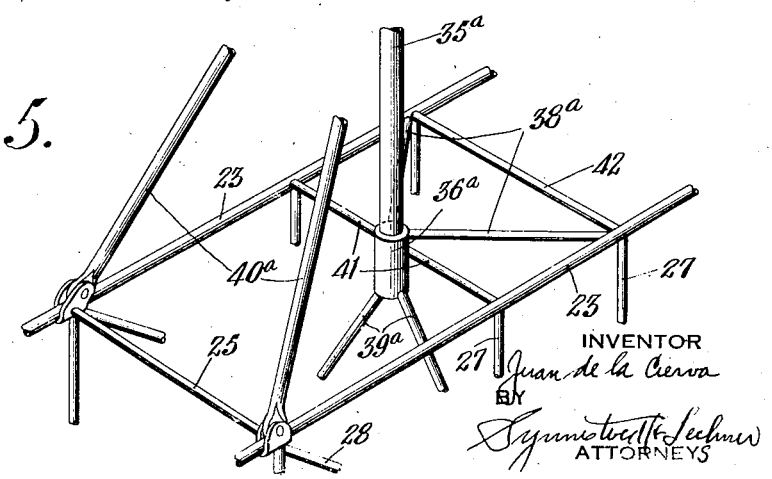

Patented May 30, 1933

1,911,183

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

AIRCRAFT WITH ROTATIVE SUSTAINING BLADES

Application filed November 24, 1930. Serial No. 497,745.

This invention relates to aircraft with rotative sustaining blades or wings and is especially concerned with mounting or supporting structures for such blades.

Among the primary objects of the invention is the increased structural efficiency by the use of mechanism or elements which are simple and rugged.

The structure of the present invention, furthermore, is such as results in an easy attachment thereof to the fuselage of the machine and, additionally, the structure is so designed as to increase aerodynamic efficiency.

Still further, the present invention contemplates improved visibility from the cockpit or cockpits of the craft as well as greater accessibility thereof.

How the foregoing, together with other objects and advantages are obtained, will be apparent from a consideration of the following description taken with the accompanying drawings, in which Figure 1 is a side view of an aircraft, of the type hereinbefore referred to, embodying one form of the invention to be set forth more fully herebelow;

Figure 2 is a fragmentary perspective view of certain of the structural members of the body or fuselage of the craft illustrating the manner of attachment thereto of the supporting or mounting structure shown in Figure 1; and Figures 3, 4 and 5 are views similar to Figure 2 but illustrating somewhat modified arrangements of the mounting structure.

Aircraft of this general type ordinarily include a set of sustaining blades such as indicated at 6 in Figure 1 which are mounted to revolve about a common substantially vertically disposed axis. In this instance, the blades or wings 6 are illustrated as being articulated or pivoted to a hub member 7 by means of joints such as indicated at 8 and 9. The hub member 7 is associated with a suitable substantially vertically disposed shaft (not shown) on which the hub is mounted for rotation. Additionally, the hub member is preferably provided with an upward extension 10 to which cables or wires 11 are secured and from which such cables or wires extend to the blades 6 in order to support them when they are inactive, and thus prevent fouling on other parts of the craft such, for example, as the tail structure which is indicated in general, at 12, or the propeller 13.

The craft, of course, is also provided with suitable landing gear 14, wheels 15 and tail skid 16, as well as one or more cockpits such as indicated in Figure 1 at 18 and 18b.

In order to support or mount the sustaining blades or blade system above the body or fuselage of the craft, the present invention contemplates the use of a tripod-like or pyramidal pylon structure which in accordance with the showing of Figure 2, includes a supporting strut or leg 17 extending upwardly from the fuselage in front of the cockpit 18. The leg 17, furthermore, is centrally arranged transversely of the craft, and from inspection of Figure 2 it will be seen that the remaining two legs of the tripod 19, 19 extend upwardly from points adjacent the sides of the fuselage and in the rear of the cockpit 18, all of said legs converging upwardly and being secured together, for example, as indicated in this figure. From inspection thereof it will be seen that the upper ends of the legs 19 are positioned on opposite sides of the leg 17 and that a securing bolt, rivet or the like, 20, extends transversely through all three members. At this point it should be noted that according to this form, the leg 17 carries an upwardly extending portion such as indicated at 21, which may be used as a spindle or shaft on which the hub member of the sustaining blade system may be mounted.

It should be noted that, as shown in Figure 1, the legs or struts of the supporting structure are preferably stream-lined as incated at 17b and 19b as well as suitably faired into the body of the craft. In addition, the pylon apex is preferably housed in a stream-lined member or sheath 20a.

By further reference to Figure 2 it will be seen that the lower ends of the legs 19 are secured to the fuselage framework by means of yokes or other suitable devices such as indicated at 22. Preferably, the points of attachment are arranged longitudinally of the longerons or beams 23 at points coinciding with or at least adjacent to the juncture of a crosstie or bracing member 24.

The fuselage, of course, also includes other substantially horizontally disposed cross braces such as indicated at 25 and 26, as well as vertically arranged interbracing members 27 and diagonal elements 28. A cockpit is preferably arranged between cross members such as those indicated at 24 and 25, the cockpit opening through the fuselage covering being illustrated in Figure 2 in dot and dash lines at 18a.

Furthermore, as shown in Figure 2, the lower end of the strut 17 may be rigidly secured to the frame work by means of diagonal braces 29 and 30, those numbered 29 being extended to points of attachment of the longérons 23 and the brace 26, and those numbered 30 being extended to points on the longérons adjacent the cross brace 25.

It will be seen, therefore, that according to this arrangement or modification, the supporting structure is disposed above a cockpit of the craft with one leg thereof positioned in front of the cockpit substantially in the center of the craft transversely thereof, and with the remaining legs extended to points at the sides of the fuselage in rear of the cockpit. A high degree of visibility, therefore, is provided for and, in addition, the cockpit may very readily and conveniently be entered. Furthermore, the structure involves the use of only a very few exposed parts, so that parasite drag and the like is reduced to a minimum.

It should also be observed that the general arrangement provides a very rigid or strong construction through which the load or weight of the craft may be carried by the sustaining blades, and in this connection it should be noted that the upward pull or lift of the sustaining rotor construction which is relatively great, during forward flight and climbing, in the forward or front portion of the general path of travel of the sustaining blades, is well taken care of and distributed between various longérons and crossties of the fuselage by means of the leg 17 and the supporting members 29 and 30. In a similar manner, when craft of this character land on the ground, particularly where there is some forward speed thereof, the forward and downward thrust incident to the taking of the load or weight of the sustaining rotor construction on the fuselage, is also distributed to various structural members thereof through the braces 29 and 30.

On the other hand, in straight vertical descent, there is an accentuation of the direct upward line of lift through axis 21, and at the moment of impact a centralization of force directly downward, and by my construction these major upward and downward stresses, acting in a line substantially coincident with the line of said axis 21 (extended), fall substantially in the center of the triangle formed by the bases of the three legs. All stresses of compression and tension, and also of torsion or bending (if such be present) thus fall upon a structure eminently stable and rigid, which, though of triangulated character, is arranged to distribute those forces thoroughly over the more-or-less squared fuselage framing, as well as stresses induced by flapping of the wings.

Still further the fore and aft division and disposition of the legs 17 and 19 makes it possible to utilize the structure and total weight of such legs in a highly efficient manner. This will be apparent upon consideration of the fact that the greatest strain or stress to which the single leg 17 is subjected probably is the tension strain which occurs during forward flight, especially when climbing. In view of the "tension" character of this force or strain, a single element, such as the leg 17, is sufficient and may even be made of relatively light construction.

In considering the three modifications illustrated in Figures 3, 4 and 5, it should be noted that various structural members of the fuselage are indicated by the same reference characters as applied to the showing in Figure 2.

In addition, in Figure 3, the general arrangement of the pylon struts or legs 17a and 19a is the same as that of Figure 2, with the exception that the single leg 17a is secured to the center of the fuselage in back of the cockpit provided between the members 24 and 25, instead of in front thereof. In this instance, the struts 19a are attached to the framework lengthwise of the longérons 23, preferably, at the points of juncture of such longérons and crosstie 25. The lower end of the leg 17a, however, according to this modification, is secured to the cross brace 24 by means of the yoke 31, and in order to distribute the load transmitted from the body of the craft to this strut, additional diagonal braces such as indicated at 32 and 33, are preferably provided. The braces 32, as illustrated, extend outwardly and rearwardly to the longérons 23 adjacent to the crosstie 34, while the diagonal braces 33 diverge laterally and downwardly, preferably to the lower longérons (not shown but similar to those shown in Fig. 4). With respect to the modification of Fig. 3, it should be noted that the structure illustrated provides for clear vision directly forwardly from the cockpit or cockpits and, in addition, attention is called to the fact that the arrangement of the legs at the apex lends itself very well to stream-lining, for example, by means of a sheathing such as illustrated at 20a in Figure 1.

In both Figures 4 and 5, the construction illustrated includes one leg or strut which is substantially vertically disposed. This construction, therefore, permits the use of one relatively rigid or strong post or strut the axis of which is substantially coincident with the line of lift or sustention, during flight, as well as the line of thrust during landing and while the craft is at rest on the ground. With a vertical post of this character the other struts or members of the pylon may take the form of diagonal braces which may be made of relatively light construction.

In Figure 4, the vertical strut is indicated at 35 and from inspection of this figure it will be seen that the lower end of strut 35 is socketed in the member 36 to which suitable cross members 37 and diagonal braces 38 and 39 may be secured. Furthermore, in accordance with the showing of Figure 4, the single substantially vertically disposed leg 35 is petitioned in front of a cockpit, while the two additional supporting legs 40 extend downwardly and rearwardly to the longérons 23 adjacent to the ends of the crosstie 24. It will be understood, of course, that the cockpit just referred to is located or arranged between the crossties 24 and 37, so that in this instance also, the pylon structure straddles a cockpit, although the spindle 21 at the top of the structure takes a position, with respect to the cockpit, forward of that which this part occupies in the constructions of Figures 2 and 3.

Finally, in connection with Figure 5, attention is called to the fact that the substantially vertically disposed strut 35a is positioned in rear of a cockpit, which is formed in this instance between the crossties 41 and 25. A socket member 36a is also provided to receive the lower end of the strut 35a and, similarly to the arrangement of Figure 4, this modification includes diagonal braces 38a and 39a, all of which are extended to meet the longérons 23 preferably at points of attachment thereto of other horizontally and vertically disposed bracing members such as those indicated at 42, 27 and 28. The other legs 40a, in this form, extend forwardly and downwardly to the longérons 23, and are secured thereto in a manner similar to that already described. It might also be noted that this last form of construction affords the advantages of the vertical post along with others similar to those noted above in connection with Figure 3, for example, clear forward vision and ease of stream-lining the pylon apex.

In conclusion, it should be noted that, according to the foregoing, increased structural and aerodynamic efficiency are provided by the use of a simple form of apparatus. Various stresses and the like are also well distributed over the fuselage frame and accessibility of the cockpit or cockpits as well as clear vision therefrom is attained.

I claim:

1. In an aircraft, a single rotative air-actuable sustaining unit providing the primary lift for the craft and comprising a freely rotatable hub with elongated wings swingingly pivoted thereon, a main frame for the craft having upper and lower longitudinal members, a mounting structure for the unit including a non-rotative axis member positioning said hub at a distance above the main frame of the craft and having legs mounted on said upper longitudinal members and a leg mounted between a pair of longitudinal members, and means distributing stresses between said intermediate leg and both upper and lower fuselage members; whereby the lift of the rotor unit and the stresses due to the pivotal swinging of the wings thereof in flight, as well as the load of said unit upon landing, are carried through said legs and distributed between the fuselage members.

2. In an aircraft, a plurality of air-rotative and swingingly pivoted sustaining wings, a short mounting hub therefor, a body having a cockpit located directly beneath said hub, and a tripod pylon structure located above said body and connected thereto, the legs of said pylon converging at the top, with a non-rotative axis member thereat on which the hub is mounted, and said legs being arranged in two divisions one of which comprises one leg disposed intermediate the sides of the body and the other of which comprises a pair of legs, one of said divisions being mounted in front of the cockpit, and the other division being mounted in rear thereof; whereby said three legs take the flight loads of lift and of swinging of the blades, as well as the load of the rotor upon landing, while leaving the cockpit free for ready access.

3. In an aircraft, a substantially rectangularly framed fuselage having longitudinal members and diagonal braces, a set of air-rotatable and swingingly pivoted wings for sustaining the craft, an odd-legged triangulated mounting pylon for said wings secured to the fuselage, and carrying the major lift and swinging loads of said wings, and means including said diagonal fuselage braces for distributing stresses between said triangulated pylon and all the longitudinal members of said rectangularly framed fuselage.

4. In an aircraft, a body, a forward propulsion engine mounted in the nose thereof, a primary sustaining system of flexibly-pivoted air-rotative wings, axis mechanism for said system, and a tripod pylon arranged to mount said axis mechanism in spaced relation to, and above, said body, the odd leg of the pylon extending from said mechanism downwardly and forwardly toward the point of mounting of the propulsion means and being secured to the body intermediate the sides thereof, whereby a good portion of the lift load of said rotor system is carried from a point adjacent said engine.

5. In an aircraft, a body, a forward propulsion engine, a primary sustaining system of air-rotative wings and a hub or axis to which they are individually pivoted, fixed axis mechanism for said system, and a multiple-leg pylon arranged to mount said axis mechanism in spaced relation to, and above, said body, a majority of said legs extending upwardly and rearwardly, and all of the legs converging to carry said fixed axis for said hub whereby the widest part of the axis mount is toward the front of the pylon to facilitate streamlining of the converging part of the pylon.

In testimony whereof I have hereunto signed my name.

JUAN DE LA CIERVA.